H. D. HAMILTON.
NAIL.
APPLICATION FILED SEPT. 9, 1920.

1,375,633.

Patented Apr. 19, 1921.

INVENTOR
Harry D. Hamilton

UNITED STATES PATENT OFFICE.

HARRY D. HAMILTON, OF WINTHROP, MASSACHUSETTS, ASSIGNOR TO UNITED SHOE MACHINERY CORPORATION, OF PATERSON, NEW JERSEY, A CORPORATION OF NEW JERSEY.

NAIL.

1,375,633.      Specification of Letters Patent.     Patented Apr. 19, 1921.

Application filed September 9, 1920. Serial No. 409,127.

*To all whom it may concern:*

Be it known that I, HARRY D. HAMILTON, a citizen of the United States, residing at Winthrop, in the county of Suffolk and State of Massachusetts, have invented certain Improvements in Nails, of which the following description, in connection with the accompanying drawings, is a specification, like reference characters on the drawings indicating like parts in the several figures.

The present invention relates to improvements in fastenings and is herein exemplified in a nail intended for attaching rubber heels to boots and shoes.

Within comparatively recent years the demand for rubber heels has increased very rapidly; so much so, in fact, that shoe manufacturers are now attaching large numbers of rubber heels to shoes in addition to the rubber heels attached by shoe repairers. The commercial rubber heels now in use are substantially all standardized for attachment to shoes by headed fastenings such as nails. For this purpose the heels are provided with a plurality of nail driving passages extending approximately halfway through each heel from its tread surface in which attaching nails may be countersunk out of nail wearing contact, and washers are embedded in the heels at the terminations of the nail passages upon which the heads of the nails are seated. Prior to the present invention, headed nails of any type having the appropriate diameter to pass through the holes in the washers have been used to attach the heels, with the result that numerous difficulties have been experienced, and, in many instances, the heels have been attached improperly to render good service and give satisfaction to the wearer. One reason for the unsatisfactory nailing of such heels to shoes, for example, is due primarily to the absence of a positive nail guiding throat or support for a nail during its passage through the rubber walled passage formed in the heel, with the result that the driver or nail set tends to engage the nail at an angle and either slip from the head of the nail, in which case it is not driven "home," or the nail is driven crookedly into the shoe. Also, many times, the drivers or nail sets, particularly in machine attachment of the heels where the drivers have a predetermined driving stroke, cause the heads to be sheared from the shanks of the nails when the heads engage the metal washers in the heels which, of course, destroys the holding power of the nails. Again, the failure of the points of the nails properly to clench with the heads of the nails firmly seated on the washers allows the heels to "open up" along their side surfaces, which is not only detrimental to the appearance of the shoe, but also permits the rubber heel to become more readily pulled off the shoe.

It is the purpose of this invention to provide an improved fastening, such as a nail especially constructed and adapted to meet the particular requirements of attaching rubber heels to shoes, to the end that heels may be applied to shoes with greater facility and a more effective and satisfactory attachment of the heels to the shoes may be effected than is possible with the nails heretofore available for this work.

With this object in view, the present invention as herein illustrated provides a rubber heel attaching nail comprising, in combination, a shank having a tapering portion terminating in a clenching point disposed concentrically of the shank and an enlarged head also disposed concentrically of the shank and having a filleted junction with the shank, the said head having formed in its upper surface a cup the curvature of which is relatively proportioned to the said filleted junction to provide the maximum thickness of the head adjacent to the shank of the nail. In the illustrated embodiment of the invention the enlarged head is joined to the shank at a relatively small but progressively increasing inclination to the vertical axis of the nail from the shank to the head to form the filleted junction referred to and the depression in the upper surface of the head of the nail is inclined relatively to the said vertical axis more than is the inclined surface forming the junction between the head and the shank.

It will be recognized that this construction of nail provides, first, maximum strength for the head of the nail to receive the blow of a hammer in driving the nail into the heel and to prevent the head of the nail from being sheared from the shank of the nail when it engages the metal washer in the heel and second, for such coöperation between the head of the nail and the driver or nail set as to insure the nail being driven straight and with its point properly clenched.

Other objects and features of the invention will be apparent from the following description when considered in connection with the accompanying drawings which illustrate a preferred embodiment of the invention and the invention will then be defined in the appended claims.

Figure 1:
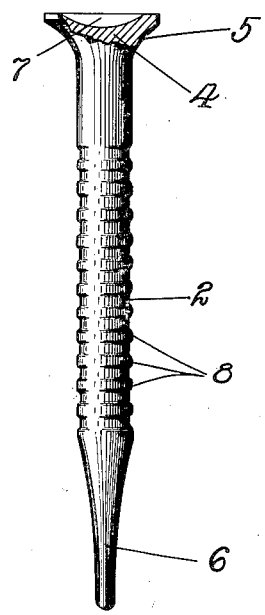
Figure 1 shows in enlarged longitudinal section the preferred embodiment of the nail of the present invention.
Figure 2:
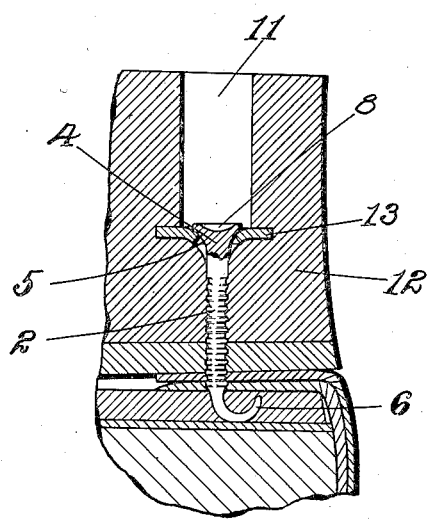
Fig. 2 shows a shoe, partly in section, having a rubber heel attached thereto by the nails of the present invention.

The illustrated nail comprises a shank 2 and a head 4. The shank of the nail is either cut or drawn to the appropriate diameter to pass through the holes in a washer embedded in the rubber heel. The point or lower end of the shank portion 2 has a relatively long tapering portion 6 terminating in a point disposed concentrically of the shank of the nail, this tapering portion being of sufficient length to enable the nail to be curled or clenched within certain limits. By providing a relatively long, tapering clenching end for the nail it is possible to use a nail of one size or length over a range of different sizes of work while at the same time insuring the curling of the nail within its tapered or clenching portion so that a proper clench of the nail is at all times assured. The upper end or head portion of the shank is provided with an enlarged head also disposed concentrically of the shank portion. The head of the nail is formed by developing a relatively short portion gradually expanded from the shank and, as herein illustrated, this expanded portion 5 or underside of the head is slightly concaved so as to form in effect a filleted junction between the head and the shank of the nail. The upper surface of the head is provided with a cup or recess 7 to receive and coöperate with the end of a driver or nail set employed in driving the nail. The curvature of this cup, as illustrated in the drawing, is such as to provide a gradual decrease in the vertical thickness of the head toward its periphery. In this way the greatest vertical thickness or maximum strength of the head 4 of the nail is adjacent to its shank. The curvature of the cup 7 in the head of the nail is dependent, of course, upon the curvature of the concaved under surface 5 of the head but it is important that the concavity in the upper surface of the head be less than that of the curvature of the filleted junction, otherwise the maximum vertical thickness of the head of the nail would not be obtained. Formed on the shank of the nail adjacent to the tapered portion, but not extending to the tapered portion and also terminating at the other end a distance away from the head of the nail, are a plurality of serrations 8 to increase the holding power of the nail in the stock. Preferably, and as herein illustrated, these serrations are not formed in the shank of the nail adjacent to the head in order that the serrations will not make it difficult for nail clenching and packaging machines to handle the nail.

In the use of the nails of the invention for attaching rubber heels to shoes by hand as by repair men, the nails will be inserted in the nail passages 11 in the heels 12 successively and a flat faced hammer employed to drive the nails with their heads flush with the tread of the heel. This preliminary driving of the nails usually drives the nail through the portion of the heel below the washer and a distance into the under lying heel base of the shoe. Because of the formation of the head of the nail relatively to the shank so that its maximum thickness is adjacent to the shank, the driving blow of the hammer will not act to upset or otherwise disturb the disposition of the head relatively to the shank of the nail as often occurs with the nails heretofore used, particularly if the hammer engages the head of the nail at an angle. Further driving of the nail to clench it and seat the head 4 of the nail upon the metal washer 13 in the heel is necessarily accomplished by a nail set or smaller device which can reach into the nailing passages formed in the heel, the point of the set being placed in the cupped center 7 of the head of the nail whereby the cup co-acts with the end of the nail set to prevent the nail set from slipping off the head of the nail as it is driven home through the nail passage. It will be noted that the nail passages 11 in the heel provide no positive guide for the nail during its passage through the nail holes but, on the contrary, the walls of the nail holes being rubber and therefore, resilient, allow the nails to be tipped in the holes. The co-acting cup in the heel and the formation of the nail point, however, enable the operator to pry over and hold in upright position any nail which tends to run out of alinement during its passage through the hole. As the nail is forced into engagement with the metal washer in the heel the reinforced head 4 and shank formation of the upper part of the nail is enabled to withstand the contact with the washer and the head of the nail is therefore not sheared off from the shank by the washer. With the heel attaching nails heretofore used, it was a very common occurrence for the washer to strip the head of the nail from the shank as it engaged the washer. In driving the nail its point engages any suitable clenching surface and, because of the relatively long tapering portion, the nail is curled back on itself and its point directed away from the interior of the shoe even if the nail used is somewhat too long for the thickness of the given work. In other words, the point of the nail is enabled to be clenched properly over a greater portion of its surface than is possible with a short, relatively blunt, clenching portion. One of the important advantages gained in using the nail of the invention is found in attaching heels wherein the nailing passages are relatively small in diameter, as for example where they are less, if anything, in diameter than the head of the nail. The gradually expanded upper portion forming the head of the nail of the invention when used in attaching a heel of this kind causes the rubber of the heel to be wedged outwardly uniformly and the nail therefore maintained straight while it is being driven through the hole by the nail set.

In using the nails of the invention when attaching heels by a heeling machine of the type usually used in attaching leather lift heels it will be appreciated that the gang drivers are enabled to coöperate with the heads of the nails much more efficiently than if the heads of the nails were substantially flat and because of the filleted junction of the head and shank of the nail the nails are driven under the drivers regardless of the absence of a positive nail-guiding throat for the nails.

Having thus described my invention, what I claim as new and desire to secure by Letters Patent of the United States is:

1. A nail for attaching rubber heels to shoes, comprising in combination, a shank having a tapering portion terminating in a clenching point disposed concentrically of the shank and an enlarged head disposed concentrically of the shank and having a filleted junction with the shank, the upper surface of said head being cupped over substantially its entire area and having a curvature so arranged relatively to the said filleted junction as to provide the maximum thickness of the head adjacent to the shank of the nail.

2. A nail for attaching rubber heels to shoes, comprising in combination, a shank having a tapering portion terminating in a clenching point disposed concentrically of the shank and an enlarged head disposed concentrically of the shank and having a filleted connection with the shank, the upper surface of the head of the nail being cupped over substantially its whole area and having such curvature that the upper surface of the head of the nail and the surface of the fillet converge from the center to the periphery of the head of the nail.

3. A nail for attaching rubber heels to shoes having an elongated shank provided with a center point and a head connected to the shank through a fillet extending substantially from the shank to the periphery of the head of the nail, the upper surface of the heads of the nail being cupped throughout substantially its whole area.

4. A nail for attaching rubber heels to shoes comprising a substantially cylindrical shank having at one end a long tapering portion terminating in a point disposed concentrically of the shank and having at its other end a relatively small but progressively expanded portion to form an enlarged head the upper surface of which is cupped, the surface of the cup being so related to the surface of the said expanded portion as to provide the greatest thickness of the head adjacent to the shank of the nail.

5. A nail for attaching rubber heels to shoes having a substantially cylindrical, elongated shank terminating in a center point and having a head attached to the shank through a fillet and having its upper surface cupped over substantially its whole area.

In testimony whereof I have signed my name to this specification.

HARRY D. HAMILTON.